United States Patent
Ming et al.

(10) Patent No.: US 9,951,256 B2
(45) Date of Patent: Apr. 24, 2018

(54) STORAGE-STABLE HEAT-ACTIVATED TERTIARY AMINE CATALYSTS FOR EPOXY RESINS

(71) Applicant: Dow Global Technologies LLC, Midland, MI (US)

(72) Inventors: Ming Ming, Shanghai (CN); Shaoguang Feng, Shanghai (CN); Yan Fei Liu, Shanghai (CN); Robert D J Froese, Midland, MI (US); Andreas Lutz, Galgenen (CH); Glenn G. Eagle, Bloomfield Hills, MI (US); Gary L. Jialanella, Oxford, MI (US); Eric E. Cole, Grand Blanc, MI (US); Michael R. Golden, Waterford, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/636,508

(22) Filed: Mar. 3, 2015

(65) Prior Publication Data
US 2015/0166857 A1 Jun. 18, 2015

Related U.S. Application Data

(62) Division of application No. 13/640,887, filed as application No. PCT/US2011/041966 on Jun. 27, 2011, now Pat. No. 9,000,120.

(60) Provisional application No. 61/431,863, filed on Jan. 12, 2011.

(30) Foreign Application Priority Data

Jun. 29, 2010 (WO) ............. PCT/CN10/74701

(51) Int. Cl.
*C08G 8/28* (2006.01)
*C09J 163/00* (2006.01)
*C08G 59/62* (2006.01)
*C08G 59/68* (2006.01)
*C09J 163/04* (2006.01)

(52) U.S. Cl.
CPC ......... *C09J 163/00* (2013.01); *C08G 59/621* (2013.01); *C08G 59/686* (2013.01); *C09J 163/04* (2013.01)

(58) Field of Classification Search
CPC .................................... C08G 59/686
See application file for complete search history.

(56) References Cited

U.S. PATENT DOCUMENTS

| 3,686,359 | A | | 8/1972 | Soldatos et al. |
| 4,066,625 | A | | 1/1978 | Bolger |
| 4,302,373 | A | | 11/1981 | Steinmetz |
| 4,659,779 | A | | 4/1987 | Bagga et al. |
| 4,701,378 | A | | 10/1987 | Bagga et al. |
| 4,701,478 | A | | 10/1987 | Jellinek et al. |
| 4,713,432 | A | | 12/1987 | Bagga et al. |
| 4,734,332 | A | | 3/1988 | Bagga et al. |
| 4,876,324 | A | * | 10/1989 | Nakano ............... C08G 8/10 528/142 |
| 5,021,513 | A | | 6/1991 | Bagga |
| 5,112,932 | A | | 5/1992 | Koenig et al. |
| 5,202,390 | A | | 4/1993 | Mülhaupt et al. |
| 5,278,257 | A | | 1/1994 | Mülhaupt et al. |
| 5,686,506 | A | * | 11/1997 | Gerber ............... C04B 35/03 523/139 |
| 6,884,854 | B2 | | 4/2005 | Schoenfeld et al. |
| 2005/0070634 | A1 | | 3/2005 | Lutz et al. |
| 2005/0209401 | A1 | | 9/2005 | Lutz et al. |
| 2006/0276601 | A1 | | 12/2006 | Lutz et al. |

FOREIGN PATENT DOCUMENTS

| EP | 0 308 664 A1 | 3/1989 |
| EP | 0 200 678 B1 | 9/1990 |
| EP | 1 602 702 A1 | 12/2005 |
| EP | 1 632 533 A1 | 3/2006 |
| SU | 726137 A1 * | 4/1980 |
| WO | WO 2001/094492 A1 | 12/2001 |
| WO | WO 2005/118734 A1 | 12/2005 |
| WO | WO 2012/000171 A1 | 1/2012 |

OTHER PUBLICATIONS

Xingming, Cheng, et al., CN1687229A—Chinese Abstract, "Method for preparing composition of epoxy resin for packaging semiconductor", Oct. 26, 2005.
Zhixiong, Huang, et al., CN1651542—Chinese Abstract, "Epoxy resin binding agent for sand paper and its preparation method", Aug. 10, 2005.

* cited by examiner

*Primary Examiner* — Kuo-Liang Peng

(57) ABSTRACT

Epoxy adhesive compositions contain a heat-activatable catalyst. The heat-activatable catalyst includes a tertiary amine catalyst and a novolac resin that has a weight average molecular weight of at least 3000. One-component epoxy adhesive formulations that contain the heat-activatable catalyst have unexpectedly good storage stability.

2 Claims, No Drawings

STORAGE-STABLE HEAT-ACTIVATED TERTIARY AMINE CATALYSTS FOR EPOXY RESINS

This application is a division of application Ser. No. 13/640,887, filed 12 Oct. 2012, now U.S. Pat. No. 9,000,120, which is a § 371 application of PCT/US2011/041966, filed 27 Jun. 2011, which claims benefit of U.S. Provisional Application No. 61/431,863, filed 12 Jan. 2011.

This invention relates to tertiary amine catalysts for epoxy resins, and epoxy adhesives containing such catalysts.

Epoxy adhesive systems contain at least an epoxy resin, a hardener that reacts with oxirane groups on the epoxy resin to cure the polymer, and one or more catalysts. These can be generally characterized as being of two main types. The first type is a two-part system, in which the epoxy resin and the hardener are packaged separately, and are not brought together until immediately before the adhesive is to be applied and cured. The two-part adhesives have the advantage of very long shelf life, but are more difficult to use because the two components must be metered and mixed at the time of application. Metering and mixing errors can lead to inadequate curing and/or poor development of adhesive properties.

One-part adhesives, on the other hand, are much easier to use because the metering and mixing steps are eliminated. These adhesives are formulated with the proper ratio of epoxy resin and hardener, and so they usually cure well and develop good properties. In order to provide these products with the necessary shelf-stability, so they do not cure prematurely, they are usually formulated with a solid hardener and a heat-activated catalyst. Upon application, the adhesive is brought to an elevated temperature, usually 80° C. or higher, to melt the hardener and activate the catalyst. This allows the adhesive to cure.

Many adhesives used in automotive applications are one-component types. These are often based on a rubber-modified epoxy resin and a reactive "toughener". Adhesives of these types are described in, for example, U.S. Pat. No. 5,202,390, U.S. Pat. No. 5,278,257, WO 2005/118734, U.S. Published Patent Application No. 2005/0070634, U. S. Published Patent Application No. 2005/0209401, U.S. Published Patent Application 2006/0276601 and EP-A-0 308 664.

The heat-activated catalyst in these systems is typically an aminophenol compound which is incorporated into a solid matrix material. The matrix material contains multiple phenolic groups. One matrix material is a polymer of a vinyl phenolic compound, such as is described in U.S. Pat. No. 4,713,432. A second matrix material is an oligomeric novolac resin, such as is described in U.S. Pat. No. 4,701,378. The poly(vinyl phenol) types have heretofore been the matrix materials of choice, as the novolac resins of U.S. Pat. No. 4,701,378 have demonstrated somewhat poorer shelf stability when incorporated into a one-component epoxy adhesive formulation. However, long shelf stability is still desired.

This invention comprises in one aspect a mixture of a solid or liquid tertiary amine compound that has a boiling temperature of at least 130° C. and a novolac resin that has a weight average molecular weight ($M_w$) of at least about 3000.

This invention is also a one-component epoxy adhesive, comprising:
A) one or more epoxy resins;
B) at least epoxy hardener having a melting temperature of at least 50° C.; and
C) a heat-activatable catalyst comprising a mixture of a solid or liquid tertiary amine compound that has a boiling temperature of at least 130° C., and a novolac resin that has a weight average molecular weight of at least about 3000;

In certain aspects, the invention is a toughened one-component epoxy adhesive, comprising
A) one or more epoxy resins;
B) at least one epoxy hardener having a melting temperature of at least 50° C.; and
C) a heat-activatable catalyst comprising a mixture of a solid or liquid tertiary amine compound that has a boiling temperature of at least 130° C. and a novolac resin that has a molecular weight of at least about 3000;
D) at least one rubber, amine-epoxy adduct or fatty acid-epoxy adduct; and
E) at least one elastomeric toughener that has blocked or capped isocyanate groups.

In any of the foregoing aspects, the novolac resin preferably has a weight average molecular weight of at least 5000. The weight average molecular weight may be 30,000 or higher. All molecular weights herein are expressed in daltons.

It has been found that the selection of a high molecular weight novolac resin provides the heat-activatable catalyst, and one-component epoxy adhesives containing the catalyst, with exceptional storage stability. The one-component epoxy adhesives often exhibit storage stabilities that are up to several months longer (at 25° C.) than are obtained with the conventionally preferred poly(vinyl phenol)-encapsulated catalyst. This result is considered quite surprising in that the weight average molecular weight of the novolac has not heretofore been understood to have any significant relationship to the performance of the catalyst. In U.S. Pat. No. 4,701,378, not only is the molecular weight somewhat limited, but within the described molecular weight range, there does not appear to be a correlation between molecular weight and storage stability of the catalyst.

The invention has the further advantage of providing good curing characteristics to the epoxy adhesive formulation, once heated to a necessary activation temperature. The activation temperatures are in general not higher, or not significantly higher, than those required for conventional poly(vinyl phenol)-encapsulated catalysts, and thus no significant difference in the curing conditions are needed with this invention.

The invention is also a method for making the heat-activetable catalyst component of the one-component epoxy adhesive. The method in certain embodiments comprises
a) combining a tertiary amine catalyst having a melting temperature of no greater than 60° C. and a boiling temperature of at least 130° C. with a particulate novolac resin having a weight average molecular weight of at least 5000 and a volume average particle size of 175 microns or less, at proportions such that from 0.1 to 10 equivalents of phenol groups are provided by the novolac resin per equivalent of tertiary amine groups provided by the tertiary amine catalyst;
b) heating the mixture formed in step a) to a temperature of from 65 to 130° C. but below the melting temperature of the novolac resin until a clear mixture is obtained; and
c) cooling the clear mixture to a temperature of 50° C. or less.

In other embodiments, the method of making the heat-activatable catalyst comprises:
a) mixing a tertiary amine catalyst having a melting temperature of no greater than 60° C. with a liquid solution of a novolac resin having a weight average molecular weight of at least 5000 in a lower alcohol, at a temperature above the melting temperature of the tertiary amine catalyst but not greater than 80° C. and not greater than the boiling temperature of the lower alcohol and at proportions such that from 0.1 to 10 equivalents of phenol groups are provided by the novolac resin per equivalent of tertiary amine groups provided by the tertiary amine catalyst, whereby the reaction mixture separates into a liquid phase containing mainly the lower alcohol and a precipitate of the tertiary amine catalyst and the novolac resin;

b) separating the precipitate from the liquid phase while maintaining the temperature of the precipitate at no greater than 80° C. and c) drying the separated precipitate at a temperature of no greater than 80° C. to remove residual lower alcohol from the precipitate.

These processes form making the heat-activatable catalyst allow it to be prepread with little or no formation of agglomerates and without producing significant amine odors. Surprisingly, a one-component epoxy adhesive that contains the heat-activated amine catalyst made in either of these methods is often more storage-stable than those that contain similar amine catalysts that are encapsulated in the same novolac resin via conventional, higher-temperature processes.

The catalyst of the invention contains a certain tertiary amine compound and a novolac resin having a weight average molecular weight of at least 3000. The tertiary amine compound is characterized in having at least one tertiary amino group, in which the amine nitrogen atom is preferably bound to aliphatic carbons. The tertiary amine compound is a solid or liquid at room temperature (about 23° C.). If a solid, the tertiary amine compound should have a melting temperature of not greater than 60° C. It also has a boiling temperature of at least 130 ° C., preferably at least 150° C. and still more preferably at least 200° C.

Examples of suitable tertiary amine compounds include, for example, trialkylamines such as triethylamine, trimethylamine, tertiary diamines such as N,N,N'N'-tetramethylbutane diamine, 1,7-bis(dimethylamino)heptane, bis(4-dimethylaminophenyl)methane and triethylene diamine, aromatic amines such as N,N-dimethylaniline, nitrogen-containing heterocyclic compounds such as 1-methylimidazole, benzimidazole, 2-phenylimidazole and quinoline, and well as aminophenols.

The preferred aminophenol catalyst contains at least one phenolic hydroxyl group, by which it is mean a hydroxyl group bonded directly to a ring carbon atom of an aromatic ring structure. The aminophenol catalyst also contains at least one aliphatic tertiary amino group. The aminophenol catalyst may contain two or more of such aliphatic tertiary amino groups. Examples of suitable aminophenol catalysts include 2-(dimethylaminomethyl)phenol, 2,6-bis(dimethylaminomethyl)phenol, 2,4-bis(dimethylaminomethyl)phenol and, especially, 2,4,6-tris(dimethylaminomethyl)phenol.

The novolac is a condensation product of an aldehyde, especially formaldehyde, and a phenolic compound. The phenolic compound can be produced from monohydric phenols such as phenol, an alkyl phenol, an alkoxyphenol or a halogenated phenol, or from polyhydric phenols such as resorcinol, catechol, hydroquinone, bisphenol, bisphenol A, bisphenol AP (1,1-bis(4-hydroxylphenyl)-1-phenyl ethane), bisphenol F, bisphenol K, bisphenol M, and the like. The bisphenol compound is preferably unsubstituted at both meta-positions, or at a meta-position and a para-position, relative to the hydroxyl group, so reactive sites are available at which the condensation reaction can occur to provide bridging sites between molecules of the phenolic compound.

The ratios of starting materials and reaction conditions are selected such that the novolac formed in the condensation reaction has a weight molecular weight of at least 3000. The weight average molecular weight of the novolac resin can be at least 5000, and may be 30,000 or more. The molecular weight is limited only by the need for the novolac resin to soften or melt at a reasonable temperature, so it can be mixed with the aminophenol compound to produce the heat-activatable catalyst. Preferably, the novolac resin softens at a temperature of from about 90 to about 200° C., especially from about 130 to 200° C.

A preferred novolac resin is a phenol-formaldehyde resin having a weight average molecular weight of from 10,000 to 25,000.

A heat-activatable catalyst can be prepared by heating the novolac resin and the aminophenol together until a clear liquid is obtained. The novolac resin and/or the aminophenol may be dissolved in a non-reactive solvent, such as a lower alcohol. Mixing ratios are preferably such that at least 0.1 phenolic hydroxyl groups are provided per tertiary amine group provided by the catalyst. It is more preferred that enough of the novolac resin is present to provide at least one phenolic hydroxyl group, and still more preferably at least two phenolic hydroxyl groups, per tertiary amine group provided by the catalyst. Up to 10, more preferably up to three, phenolic hydroxyl groups may be provided per tertiary amine group provided by the catalyst. A weight ratio of catalyst:novolac resin from 20:80 to 80:20, preferably from 70:30 to 30:70, and more preferably from 40:60 to 70:30 is useful. After a clear solution is obtained, any solvent that is present is removed, suitably by evaporation, and the resulting mixture is cooled to solidify the mixture. The product is a mixture of the tertiary amine catalyst and novolac resin; this mixture is believed to take the form of a solid solution of the materials. The phenolic groups of the novolac resin are believed to complex with the tertiary amine groups of the catalyst material; it is further believed that the complex formation contributes to the latent effect of the catalyst and also to its storage stability in the presence of an epoxy resin and hardener.

One preferred way of making the heat-activatable catalyst by the foregoing process is as follows:

The novolac resin is formed into a particulate having a volume average particle size of no greater than 175 microns, preferably no greater than 150 microns. A preferred particle size is from 1 to 150 microns, or from 10 to 150 microns. Smaller-sized particles can be used, such as a particle size as small as 10 nanometers, but little if any additional benefit is seen and it is difficult to form particles of the novolac resin that are so small. The particulate novolac resin is combined with the tertiary amine catalyst. The mixing ratio is such that at least 0.1 equivalents of phenolic hydroxyl groups are provided by the novolac resin per equivalent of tertiary amine group provided by the amine catalyst. It is more preferred that enough of the novolac resin is present to provide at least one equivalent of phenolic hydroxyl groups, and still more preferably at least two equivalents of phenolic hydroxyl groups, per equivalent of tertiary amine groups provided by the catalyst. Up to 10, more preferably up to three, equivalents of phenolic hydroxyl groups may be provided per equivalent of tertiary amine groups provided by the catalyst. After the amine and the novolac resin are combined, they are heated to a temperature of from 65 to 130° C. to produce a clear mixture. This temperature is preferably from 100 to 130° C., and more preferably from 110 to 130° C., and in any event below the melting temperature of the novolac resin. The mixture may be agitated through the mixing process to avoid forming localized hot spots. The amine and the novolac resin will form a clear mixture characteristic of a solution under these conditions provided that the novolac resin is supplied in the form of a particulate as described, and even though the temperature during this step is below the melting temperature of the novolac resin. When 2,4,6-tris(dimethylaminomethyl)phenol is the amine catalyst, dynamic scanning calorimetry measurements show that an exothermic event occurs when the starting mixture is brought into the temperature range of about 60 to about 90° C. This may be attributable to hydrogen bond formation or another form of complexation between the amine catalyst and the phenolic groups of the novolac resin. The temperature at which the exotherm occurs may vary somewhat depending on the particular amine catalyst. This exotherm is accompanied by a large increase in viscosity which resembles a gelling reaction. When the temperature of the mixture is further increased above the temperature at which the exotherm occurs, a pronounced drop in viscosity is seen. The viscosity drop is much larger than can be accounted by simple temperature effects. The mixture becomes clear as the viscosity drops, which is characteristic of forming a solution or complex. The particulate nature of the novolac resin is mostly if not entirely lost at this point. It is unnecessary to heat the mixture to a temperature above the melting temperature of the novolac resin, or to greater than 130° C.

In this process, the time required at the elevated temperature during the heating step is typically on the order of from about 1 minute to 60 minutes, and is preferably in the range of from 5 to 30 minutes. A convenient way of performing the heating step is to ramp the temperature of the starting mixture at a rate of from 2 to 20° C./minute from some starting temperature below 65° C. (generally from 20 to 30° C.) until the temperature is brought into the range of 100 to 130° C., and then to hold the mixture at a temperature of 100 to 130° C. if necessary until the viscosity of the mixture drops and/or a clear mixture is produced.

Following the heating step, the mixture is cooled to a temperature of 50° C. or less, which solidifies the product. The cooled product can be used as is, but it is generally preferred to form it into small particles by chopping, grinding or other suitable method. A volume average particle size of 175 microns or less is suitable for the product particles. As before, the particles may be as small as 10 or 100 nanometers, but a preferred minimum particle size is 1 micron and a more preferred particle size is at least 10 microns.

In this preferred process for making the heat-activatable catalyst, the process steps (including any additional steps that may be interposed between the process steps described above) are preferably performed without exposing the novolac resin to a temperature above 130° C. By maintaining such lower temperatures, agglomerate formation is minimized and fewer amine compounds are released. In addition, this process for making the heat-activatable catalyst is preferably performed in the substantial absence of any solvent for the novolac resin (i.e., less than 5 parts by weight, preferably less than 1 part, of solvent per 100 parts by weight novolac resin).

The second preferred process for making the heat-activatable catalyst is as follows:

The novolac resin is dissolved in a lower alcohol. By "lower alcohol", it is meant a straight-chain or branched aliphatic alcohol having up to five carbon atoms that is liquid at 23° C. and has a boiling temperature of no greater than 130° C. Ethanol is preferred and methanol is more preferred. The amount of the lower alcohol is sufficient to produce a solution of the novolac resin in the lower alcohol that is a liquid at a temperature of 50° C. or less. A suitable amount is from about 2 to about 30 parts by weight, preferably from 5 to 20 parts by weight, of the lower alcohol per part by weight of the novolac resin.

The amine catalyst is then combined with the novolac resin solution. It is preferred to add the amine catalyst to the novolac resin over a period of from 30 seconds to 10 minutes. The novolac resin solution is preferably heated to a temperature of from 35 to 80° C. at the time it is combined with the amine catalyst. It is also preferred that the amine catalyst is at a temperature of less than 35° C. when it is combined with the novolac resin. In an especially preferred process, the novolac resin solution is at a temperature of from 35 to 60° C., especially from 40 to 50° C., the amine catalyst is at a temperature of from 10 to 35° C., preferably from 15 to 35° C., and the amine catalyst is added to the novolac solution over a period of from 30 seconds to 10 minutes.

Applicants have found that when the novolac resin has a molecular weight of at least 5000, the mixture will form a liquid phase, which contains mainly the lower alcohol solvent, and a precipitate of the novolac resin and the amine catalyst. Some of the amine compound and the novolac may remain in the liquid phase, and some of the lower alcohol may be contained in the precipitate. It may be necessary to adjust the temperature of the reaction mixture after the components are mixed to induce the coprecipitation of the amine catalyst and novolac resin or to cause more of those materials to precipitate. This separation of the materials into separate liquid and solid phases allows one to remove the solid solution from the bulk of the lower alcohol solvent using simple liquid-solid separation techniques such as decanting, filtering, centrifugation and the like.

The recovered precipitate is then dried to remove residual solvent. The drying temperature is no greater than 80° C. A preferred temperature is from about 20 to 60° C. and a more preferred temperature is from 35 to 55° C. If desired or necessary, the drying step can be performed under reduced pressure to facilitate the removal of the lower alcohol. The precipitate may be ground, chopped or otherwise reduced in particle size before conducting the drying step; this tends to reduce the drying time that is necessary. The lower alcohol content in the dried material should be less than 1% by weight, and is more preferably no more than 0.1% by weight.

As before, the phenolic groups of the novolac resin are believed to complex with the tertiary amine groups of the catalyst material; it is further believed that the complex formation contributes to the latent effect of the catalyst and also to its storage stability in the presence of an epoxy resin and hardener.

The dried product may be formed into small particles by chopping, grinding or other suitable method. A volume average particle size of 175 microns or less is suitable. As before, the particles may be as small as 10 nanometers or 100 nanometers, but a preferred minimum particle size is 1 micron and a more preferred particle size is at least 10 microns.

In the second process, each of the described process steps (and any intervening steps that may be performed between the listed steps) are performed at temperatures of 80° C. or lower.

An epoxy adhesive according to the invention contains at least one epoxy resin. All or part of the epoxy resin may be present in the form of a rubber-modified epoxy resin, as discussed more below. A wide range of epoxy resins can be used, including those described at column 2 line 66 to column 4 line 24 of U.S. Pat. No. 4,734,332, incorporated herein by reference.

Suitable epoxy resins include the diglycidyl ethers of polyhydric phenol compounds such as resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol, diglycidyl ethers of aliphatic glycols and polyether glycols such as the diglycidyl ethers of $C_{2-24}$ alkylene glycols and poly(ethylene oxide) or poly(propylene oxide) glycols; polyglycidyl ethers of phenol-formaldehyde novolac resins, alkyl substituted phenol-formaldehyde resins (epoxy novalac resins), phenol-hydroxybenzaldehyde resins, cresol-hydroxybenzaldehyde resins, dicyclopentadiene-phenol resins and dicyclopentadiene-substituted phenol resins, and any combination thereof.

Suitable diglycidyl ethers include diglycidyl ethers of bisphenol A resins such as are sold by Dow Chemical under the designations D.E.R.® 330, D.E.R.® 331, D.E.R.® 332, D.E.R.® 383, D.E.R. 661 and D.E.R.® 662 resins.

Commercially available diglycidyl ethers of polyglycols include those sold as D.E.R.® 732 and D.E.R.® 736 by Dow Chemical.

Epoxy novolac resins can be used. Such resins are available commercially as D.E.N.® 354, D.E.N.® 431, D.E.N.® 438 and D.E.N.® 439 from Dow Chemical.

Other suitable additional epoxy resins are cycloaliphatic epoxides. A cycloaliphatic epoxide includes a saturated carbon ring having an epoxy oxygen bonded to two vicinal atoms in the carbon ring, as illustrated by the following structure I:

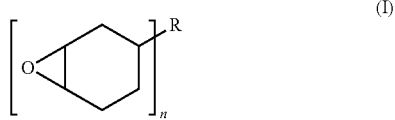

wherein R is an aliphatic, cycloaliphatic and/or aromatic group and n is a number from 1 to 10, preferably from 2 to 4. When n is 1, the cycloaliphatic epoxide is a monoepoxide. Di- or epoxy resins are formed when n is 2 or more. Mixtures of mono-, di- and/or epoxy resins can be used. Cycloaliphatic epoxy resins as described in U.S. Pat. No. 3,686,359, incorporated herein by reference, may be used in the present invention. Cycloaliphatic epoxy resins of particular interest are (3,4-epoxycyclohexyl-methyl)-3,4-epoxy-cyclohexane carboxylate, bis-(3,4-epoxycyclohexyl) adipate, vinylcyclohexene monoxide and mixtures thereof.

Other suitable epoxy resins include oxazolidone-containing compounds as described in U.S. Pat. No. 5,112,932. In addition, an advanced epoxy-isocyanate copolymer such as those sold commercially as D.E.R. 592 and D.E.R. 6508 (Dow Chemical) can be used.

The epoxy resin preferably is a bisphenol-type epoxy resin or mixture thereof with up to 10 percent by weight of another type of epoxy resin. Preferably the bisphenol type epoxy resin is a liquid epoxy resin or a mixture of a solid epoxy resin dispersed in a liquid epoxy resin. The most preferred epoxy resins are bisphenol-A based epoxy resins and bisphenol-F based epoxy resins.

An especially preferred epoxy resin is a mixture of a diglycidyl ether of at least one polyhydric phenol, preferably bisphenol-A or bisphenol-F, having an epoxy equivalent weight of from 170 to 299, especially from 170 to 225, and at least one second diglycidyl ether of a polyhydric phenol, again preferably bisphenol-A or bisphenol-F, this one having an epoxy equivalent weight of at least 300, preferably from 310 to 600. The proportions of the two types of resins are preferably such that the mixture of the two resins has an average epoxy equivalent weight of from 225 to 400. The mixture optionally may also contain up to 20%, preferably up to 10%, of one or more other epoxy resins.

The epoxy resin constitutes at least about 10 weight percent of the adhesive, more preferably at least about 15 weight percent, and most preferably at least about 20 weight percent. The epoxy resin preferably constitutes up to about 70 weight percent of the adhesive, more preferably up to about 60 weight percent, and most preferably up to about 50 weight percent.

The epoxy adhesive further contains an epoxy hardener. The hardener is a solid at room temperature has a melting temperature of at least 50° C. and preferably at least 80° C. It contains functional groups, typically primary and/or secondary amino groups, which react with oxirane groups to form a bond thereto and extend the polymer chain. Suitable such hardeners include boron trichloride/amine and boron trifluoride/amine complexes, dicyandiamide, melamine, diallylmelamine, guanamines such as acetoguanamine and benzoguanamine, aminotriazoles such as 3-amino-1,2,4-triazole, hydrazides such as adipic dihydrazide, stearic dihydrazide, isophthalic dihydrazide, semicarbazide, cyanoacetamide, and aromatic polyamines such as diaminodiphenylsulphones. Dicyandiamide, isophthalic acid dihydrazide, adipic acid dihydrazide and 4,4'-diaminodiphenylsulphone are particularly preferred.

The curing agent is used in sufficient amount to cure the composition. The curing agent suitably constitutes at least about 0.05 weight percent of the adhesive, preferably at least about 0.5 weight percent of the adhesive, more preferably at least 1.5 weight percent of the adhesive, and still more preferably at least about 2.5 weight percent of the adhesive. The curing agent preferably constitutes up to about 15 weight percent of the adhesive composition, more preferably up to about 10 weight percent, and most preferably up to about 6 weight percent.

Preferred epoxy adhesives of the invention contain at least one rubber. The rubber should have a glass transition temperature ($T_g$) of no greater than −25° C. Preferably, at least a portion of the rubber has a $T_g$ of −40° C. or lower, more preferably −50° C. or lower and even more preferably −70° C. or lower. The $T_g$ of the rubber may be as low as −100° C. or even lower.

The rubber is preferably present in the form of a rubber-modified epoxy resin, in the form of core-shell particles, or some combination of both.

A rubber-modified epoxy resin is an epoxy-terminated adduct of an epoxy resin and at least one liquid rubber that has epoxide-reactive groups, such as amino or preferably carboxyl groups. The rubber in this case is preferably a homopolymer or copolymer of a conjugated diene, especially a diene/nitrile copolymer. The conjugated diene rubber is preferably butadiene or isoprene, with butadiene being especially preferred. The preferred nitrile monomer is acrylonitrile. Preferred copolymers are butadiene-acrylonitrile copolymers. The rubbers preferably contain, in the aggregate, no more than 30 weight percent polymerized unsaturated nitrile monomer, and preferably no more than about 26 weight percent polymerized unsaturated nitrile monomer.

The rubber preferably contains (prior to reaction with the epoxy resin to form the adduct) from about 1.5, more preferably from about 1.8, to about 2.5, more preferably to about 2.2, epoxide-reactive terminal groups per molecule, on average. Carboxyl-terminated rubbers are preferred. The molecular weight ($M_n$) of the rubber is suitably from about 2000 to about 6000, more preferably from about 3000 to about 5000.

Suitable carboxyl-functional butadiene and butadiene/ acrylonitrile rubber starting materials are commercially available from Noveon under the tradenames Hycar® 2000X162 carboxyl-terminated butadiene homopolymer and Hycar® 1300X31 Hycar® 1300X8, Hycar® 1300X13, Hycar® 1300X9 and Hycar® 1300X18 carboxyl-terminated butadiene/acrylonitrile copolymers. A suitable amine-terminated butadiene/acrylonitrile copolymer is sold under the tradename Hycar® 1300X21.

The rubber is formed into an epoxy-terminated adduct by reaction with an excess of an epoxy resin. Enough of the epoxy resin is provided to react with all of the epoxide-reactive groups on the rubber and to provide free epoxide groups on the resulting adduct, without significantly advancing the adduct to form high molecular weight species. A ratio of at least two equivalents of epoxy resin per equivalent of epoxy-reactive groups on the rubber is preferred. More preferably, enough of the epoxy resin compound is used that the resulting product is a mixture of the adduct and some free epoxy resin compound. Typically, the rubber and an excess of the epoxy resin are mixed together with a polymerization catalyst and heated to a temperature of about 100 to about 250° C. in order to form the adduct. Useful catalysts for conducting the reaction between the rubber and the epoxy resin include those described below. Preferred catalysts for forming the rubber-modified epoxy resin include phenyl dimethyl urea and triphenyl phosphine.

A wide variety of epoxy resins can be used to make the rubber-modified epoxy resin, including any of those described before. Preferred epoxy resins are liquid or solid glycidyl ethers of a bisphenol such as bisphenol A or bisphenol F. Halogenated, particularly brominated, resins can be used to impart flame retardant properties if desired. Liquid epoxy resins (such as DER 330 and DER 331 resins, which are diglycidyl ethers of bisphenol A available from The Dow Chemical Company) are especially preferred for ease of handling.

When a rubber-modified epoxy resin is present, as just described, the rubber-modified epoxy resin will serve as all or part of each of components (A) (the epoxy resin) and (B) (the rubber) of the adhesive. Thus, if a rubber-modified epoxy resin is present, it is not necessary for the adhesive to include any additional rubber or any additional epoxy resin. However, one or more such additional epoxy resins may also be present, and one or more additional rubbers, notably a core-shell rubber as described below, may also be present together with a rubber-modified epoxy resin.

Another suitable type of rubber is a core-shell rubber. The core-shell rubber is a particulate material having a rubbery core. The rubbery core preferably has a $T_g$ of less than −25° C., more preferably less than −50° C. and even more preferably less than −70° C. The $T_g$ of the rubbery core may be well below −100° C. The core-shell rubber also has at least one shell portion that preferably has a $T_g$ of at least 50° C. By "core", it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material is preferably grafted onto the core or is crosslinked. The rubbery core may constitute from 50 to 95%, especially from 60 to 90%, of the weight of the core-shell rubber particle.

The core of the core-shell rubber may be a polymer or copolymer of a conjugated diene such as butadiene, or a lower alkyl acrylate such as n-butyl-, ethyl-, isobutyl- or 2-ethylhexylacrylate. The core polymer may in addition contain up to 20% by weight of other copolymerized mono-unsaturated monomers such as styrene, vinyl acetate, vinyl chloride, methyl methacrylate, and the like. The core polymer is optionally crosslinked. The core polymer optionally contains up to 5% of a copolymerized graft-linking monomer having two or more sites of unsaturation of unequal reactivity, such as diallyl maleate, monoallyl fumarate, allyl methacrylate, and the like, at least one of the reactive sites being non-conjugated.

The core polymer may also be a silicone rubber. These materials often have glass transition temperatures below −100° C. Core-shell rubbers having a silicone rubber core include those commercially available from Wacker Chemie, Munich, Germany, under the trade name Genioperl™.

The shell polymer, which is optionally chemically grafted or crosslinked to the rubber core, is preferably polymerized from at least one lower alkyl methacrylate such as methyl methacrylate, ethyl methacrylate or t-butyl methacrylate. Homopolymers of such methacrylate monomers can be used. Further, up to 40% by weight of the shell polymer can be formed from other monovinylidene monomers such as styrene, vinyl acetate, vinyl chloride, methyl acrylate, ethyl acrylate, butyl acrylate, and the like. The molecular weight of the grafted shell polymer is generally between 20,000 and 500,000.

A preferred type of core-shell rubber has reactive groups in the shell polymer which can react with an epoxy resin or an epoxy resin hardener. Glycidyl groups are suitable. These can be provided by monomers such as glycidyl methacrylate.

A particularly preferred type of core-shell rubber is of the type described in EP 1 632 533 A1. Core-shell rubber particles as described in EP 1 632 533 A1 include a cross-linked rubber core, in most cases being a crosslinked copolymer of butadiene, and a shell which is preferably a copolymer of styrene, methyl methacrylate, glycidyl methacrylate and optionally acrylonitrile. The core-shell rubber is preferably dispersed in a polymer or an epoxy resin, also as described in EP 1 632 533 A1.

Preferred core-shell rubbers include those sold by Kaneka Corporation under the designation Kaneka Kane Ace, including Kaneka Kane Ace MX 156 and Kaneka Kane Ace MX 120 core-shell rubber dispersions. The products contain the core-shell rubber particles pre-dispersed in an epoxy resin, at a concentration of approximately 25%. The epoxy resin contained in those products will form all or part of the epoxy resin component of the adhesive of the invention.

Amine epoxy adducts include, for example, reaction products of a diamine with a carboxylic anhydride and a polyphenol or an aminophenol as described in WO 01/94492. Fatty acid epoxy adducts include reaction products of fatty acids or oligomerized fatty acids (including dimer fatty acids) with epichlorohydrin, glycidol, diglycidyl ethers of polyphenols, and the like.

The adhesive of the invention preferably has a total rubber content, amine epoxy adduct and fatty acid epoxy adduct content of at least 1 weight percent, more preferably from 3 to 15 weight percent and especially from 4 to 10 weight percent. Total rubber content is calculated for purposes of this invention by determining the weight of core-shell rubber particles (if any), plus the weight contributed by the liquid rubber portion of the rubber-modified epoxy resin(s) (if any), plus the weight of any other rubbers that may be present (if any). In each case, the weight of unreacted (non-rubber-modified) epoxy resins and/or other carriers, diluents, dispersants or other ingredients that may be contained in the core-shell rubber product or rubber-modified epoxy resin is not included. The weight of the shell portion of the core-shell rubber is counted as part of the total rubber content for purposes of this invention.

A preferred adhesive in accordance with the invention further contains at least one elastomeric toughener. The elastomeric toughener is a liquid or low-melting elastomeric material that contains capped or blocked isocyanate groups. The elastomeric portion of the elastomeric toughener includes one or more soft segments such as a polyether, a polybutadiene, or a polyester. Particularly preferred soft segments include poly(ethylene oxide) blocks, poly(propylene oxide) blocks, poly(ethylene oxide-co-propylene oxide) blocks, poly(butylene oxide) blocks, poly(tetrahydrofuran) blocks, poly(caprolactone) blocks and the like. These soft segments typically have a molecular weight of from 1000 to 10,000 daltons each, preferably from about 1500 to 5000 daltons. An especially preferred type of soft segment is a poly(tetrahydrofuran) block having a weight of from 2200 to 4500 daltons.

The elastomeric toughener contains at least one blocked or capped isocyanate group per molecule. It preferably contains an average of at least 2 such groups per molecule, but typically no more than 6 and preferably no more than about 4 blocked or capped isocyanate groups per molecule. Examples of capping or blocking groups are phenols or phenolamines, primary aliphatic, cycloaliphatic, heteroaromatic and araliphatic amines; secondary aliphatic, cycloaliphatic, aromatic, heteroaromatic and araliphatic amines, monothiols, alkylamides and hydroxyl functional epoxides, and benzyl alcohols. The capping or blocking group may contain functional groups such as phenol, aromatic amino, —OCN, epoxide, or it may comprise further polyurethane elastomers bound to it, but the capping or blocking group may instead be devoid of such groups. Preferred capping groups include a secondary aliphatic amine, a hydroxyalkylepoxide, or a phenol, aminophenol, polyphenol, allylphenol, or polyallylpolyphenol such as o,o-diallyl bisphenol A.

A convenient way to produce the elastomeric toughener is by forming an isocyanate-terminated prepolymer, and then reacting the remaining isocyanate groups with the capping or blocking agent. The isocyanate-terminated prepolymer is prepared by reacting a polyether polyol or polyester polyol, which corresponds to the structure of the soft segment of the reactive tougher, with an excess of a polyisocyanate. The polyisocyanate preferably contains aliphatic isocyanate groups. Preferred polyisocyanates are hexamethylene diisocyanate and isophorone diisocyanate.

The elastomeric toughener should be soluble or dispersible in the remainder of the components of the epoxy adhesive. The elastomeric toughener preferably has a viscosity at 45° C. which is not greater than 1000 Pa·s and more preferably no more than about 800 Pa·s. Preferably, the weight average molecular weight of the toughener is about 8,000 or greater, and more preferably about 10,000 or greater. Preferably, the weight average molecular weight of the toughener is about 80,000 or less, and more preferably about 40,000 or less. Molecular weights as used herein are determined according to GPC analysis.

General methods for preparing these elastomeric tougheners are described, for example, in U.S. Pat. No. 5,278,257, WO 2005/118734, U.S. Published Patent Application No. 2005/0070634, U.S. Published Patent Application No. 2005/0209401, U.S. Published Patent Application 2006/0276601, EP 1 602 702A and EP-A-0 308 664.

The elastomeric toughener may be linear, branched or lightly crosslinked.

The elastomeric toughener is present in sufficient amount to improve the performance of adhesive compositions containing it under dynamic load. The elastomeric toughener suitably constitutes at least about 10 weight percent, preferably at least about 14 weight percent and more preferably at least about 18 weight percent of the resin component A. Preferably, the elastomeric toughener constitutes up to about 38 weight percent of the adhesive, more preferably up to about 28 weight percent and even more preferably up to about 25 weight percent of the epoxy resin component A.

A one-component epoxy adhesive may contain other optional components. Once such optional component is a bisphenol compound that has two or more, preferably two, phenolic hydroxyl groups per molecule. Examples of suitable bisphenol compounds include, for example, resorcinol, catechol, hydroquinone, bisphenol, bisphenol A, bisphenol AP (1,1-bis(4-hydroxylphenyl)-1-phenyl ethane), bisphenol F, bisphenol K, tetramethylbiphenol and the like. The bisphenol component can be dissolved into the adhesive composition or present in the form of finely divided particles. Preferably, the bisphenol component is pre-reacted with an epoxy resin (which may include a rubber-modified epoxy resin, if present) to advance the resin somewhat.

If used, the bisphenol component is preferably used in an amount from about 3 to about 35 parts by weight per 100 parts by weight of the rubber component. A preferred amount is from about 5 to about 25 parts by weight per 100 parts by weight of the rubber component. When the bisphenol component is added directly into the adhesive, it usually constitutes from 0.25 to 2 weight percent, especially 0.4 to 1.5 weight percent, of the adhesive.

The one-component epoxy adhesive of the invention may contain various other optional components. Among these, fillers, rheology modifiers or pigments, one or more additional epoxy resins and a core-shell rubber are particularly preferred.

A filler, rheology modifier and/or pigment is preferably present in the one-component epoxy adhesive. These can perform several functions, such as (1) modifying the rheology of the adhesive in a desirable way, (2) reducing overall cost, (3) absorbing moisture or oils from the adhesive or from a substrate to which it is applied, and/or (4) promoting cohesive, rather than adhesive, failure. Examples of these materials include calcium carbonate, calcium oxide, talc, coal tar, carbon black, textile fibers, glass particles or fibers, aramid pulp, boron fibers, carbon fibers, mineral silicates, mica, powdered quartz, hydrated aluminum oxide, bentonite, wollastonite, kaolin, fumed silica, silica aerogel or metal powders such as aluminum powder or iron powder. Among these, calcium carbonate, talc, calcium oxide, fumed silica and wollastonite are preferred, either singly or in some combination, as these often promote the desired cohesive failure mode.

A filler of particular interest is a microballon having an average particle size of up to 200 microns and density of up to 0.2 g/cc. The particle size is preferably about 25 to 150 microns and the density is preferably from about 0.05 to about 0.15 g/cc. Expanded microballoons which are suitable include those commercially available from Dualite Corporation under the trade designation Dualite™, and also from Lehmann & Voss, Hamburg, Germany. Specific examples of suitable polymeric microballoons include Dualite™ E065-135 and Dualite E130-40D microballoons. In addition, expandable microballoons such as Expancel microspheres, which are available commercially from Akzo Nobel. Microballoons are conveniently present at a level of from about 1 to about 5 weight percent, preferably 1.5 to 3 weight percent, of the adhesive. Microballoons are preferably used in conjunction with one or more additional fillers, such as talc, calcium oxide, wollastonite, calcium carbonate, fumed silica or mixtures thereof.

The one-component epoxy adhesive can further contain other additives such as diluents, plasticizers, extenders, pigments and dyes, fire-retarding agents, thixotropic agents, flow control agents, thickeners such as thermoplastic polyesters, gelling agents such as polyvinylbutyral, adhesion promoters and antioxidants.

Fillers, rheology modifiers, gelling agents, thickeners and pigments preferably are used in an aggregate amount of about 5 parts per hundred parts of adhesive composition or greater, more preferably about 10 parts per hundred parts of adhesive composition or greater. They preferably are present in an amount of up to about 25 weight percent of the adhesive, more preferably up to about 20 weight percent. An advantage of this invention is that the adhesive retains good adhesive strength and impact strength, even when it contains as much as 15 to 25% by weight of fillers.

The adhesive is formed by mixing the epoxy resin, hardener, heat-activatable catalyst and optional ingredients, in any convenient order. Elevated temperatures may be used to soften the various materials in order to compound them more easily, but it is desirable to avoid using temperatures high enough to melt the hardener and/or activate the catalyst. Therefore, temperatures are generally kept to below 50° C. during the adhesive-formulation process, when the hardener and/or the heat-activatable catalyst are present.

The adhesive composition can be applied by any convenient technique. It can be applied cold or be applied warm if desired. It can be applied by extruding it from a robot into bead form on the substrate, it can be applied using manual application methods such as a caulking gun, or any other manual application means. The adhesive can also be applied using jet spraying methods such as a steaming method or a swirl technique. The swirl technique is applied using an apparatus well known to one skilled in the art such as pumps, control systems, dosing gun assemblies, remote dosing devices and application guns. The adhesive may be applied to the substrate using a streaming process. Generally, the adhesive is applied to one or both substrates. The substrates are contacted such that the adhesive is located between the substrates to be bonded together.

After application, the adhesive is cured by heating to a temperature at which the curing agent initiates cure of the epoxy resin composition. Generally, this temperature is about 80° C. or above, preferably 100° C. or above. Preferably, the temperature is about 220° C. or less, and more preferably about 180° C. or less.

The adhesive of the invention can be used to bond a variety of substrates together including wood, metal, coated metal, aluminum, a variety of plastic and filled plastic substrates, fiberglass and the like. In one preferred embodiment, the adhesive is used to bond parts of automobiles together or parts to automobiles. Such parts can be steel, coated steel, galvanized steel, aluminum, coated aluminum, plastic and filled plastic substrates.

An application of particular interest is bonding of automotive frame components to each other or to other components. The frame components are often metals such as cold rolled steel, galvanized metals, or aluminum. The components that are to be bonded to the frame components can also be metals as just described, or can be other metals, plastics, composite materials, and the like.

Adhesion to brittle metals such as galvaneal is of particular interest in the automotive industry. Galvaneal tends to have a zinc-iron surface that is somewhat rich in iron content and is brittle for that reason. A particular advantage of this invention is that the cured adhesive bonds well to brittle metals such as galvaneal. Another application of particular interest is the bonding of aerospace components, particularly exterior metal components or other metal components that are exposed to ambient atmospheric conditions during flight.

The adhesive composition once cured preferably has a Young's modulus of about 1000 MPa as measured according to DIN EN ISO 527-1. More preferably, the Young's modulus is about 1200 MPa or greater. Preferably, the cured adhesive demonstrates a tensile strength of about 25 MPa or greater, more preferably about 30 MPa or greater, and most preferably about 35 MPa or greater. Preferably, the lap shear strength of a 1.5 mm thick cured adhesive layer is about 15 MPa or greater, more preferably about 20 MPa or greater, and most preferably about 25 MPa or greater measured according to DIN EN 1465.

An epoxy adhesive of the composition has excellent storage stability. Storage stability refers to the extent to which the one-component epoxy adhesive resists curing under typical conditions under which it is stored and cured. An adhesive having good storage stability builds viscosity only slowly if at all under normal storage and transportation conditions, and thus remains usable for periods of weeks or months from the time it is packaged. Therefore, storage stability can be assessed by storing the material under defined conditions and periodically measuring viscosity. Smaller viscosity increases in a given period of time indicates better storage stability and, conversely, poorer storage stability is indicated by greater increases in viscosity.

In actual practice, transportation and storage conditions often are not stringently controlled, and can vary considerably. It is not unusual for adhesive products to encounter storage temperatures of 40° C. or more during summer months, in uncooled warehouses and transportation vessels. Therefore, a preferred one-component epoxy adhesive of the invention also exhibits good storage stability at temperatures at least as high as 40° C.

Preferably, a one-component epoxy adhesive in accordance with the invention will exhibit a viscosity increase of no more than 30%, more preferably no more than 25%, after being stored under an inert atmosphere such as nitrogen for 24 weeks at a temperature of 23° C.

A one-component epoxy adhesive in accordance with the invention preferably exhibits a viscosity increase of no more than 70% (i.e., to 1.7 times its starting viscosity), still more preferably no more than 50% and even more preferably no more than 40%, after being stored under an inert atmosphere for 24 weeks at a temperature of 30° C.

A one-component epoxy adhesive in accordance with the invention preferably exhibits a viscosity increase of no more than 400% (i.e., to 3 times its starting viscosity), still more preferably no more than 350% after being stored under an inert atmosphere for 24 weeks at a temperature of 40° C.

Viscosity measurements are conveniently made using a Bohlin CS-50 or equivalent rheometer and a 4°/20 mm plate/cone system. To measure the viscosity, the sample is heated to 45° C. and equilibrated there for five minutes. The shear rate is ramped from 0.1/second to 20/second over five minutes at 45° C. and then down to 0.1/second over another five minutes, again at 45° C. Viscosity is determined at 10/second.

The following examples are provided to illustrate the invention but are not intended to limit the scope thereof. All parts and percentages are by weight unless otherwise indicated.

EXAMPLES 1-2

44 parts of a 10,000 molecular weight phenol-formaldehyde novolac resin having a softening temperature of 130° C. (Resicure 3057, from SI Group) are melted at 140° C. 56 parts of 2,4,6-tris(dimethylaminomethyl)phenol are added to the molten novolac resin, and the resulting mixture is stirred at 140° C. for 30 minutes. A clear solution is obtained, which is cooled to room temperature and ground to a powder. The resulting heat-activatable catalyst is designated Example 1.

Example 2 is prepared by dissolving 44 parts of a 24,000 molecular weight phenol-formaldehyde novolac resin (Resicure 5200, from SI Group) having a softening temperature of 180° into methanol. The resulting solution is combined with 56 parts of 2,4,6-tris(dimethylaminomethyl)phenol and brought to reflux for two hours to form a clear solution. The mixture is cooled to room temperature and the methanol is removed by evaporation. The resulting solid is dried and ground to a powder.

EXAMPLE 3

A simple epoxy adhesive formulation is prepared to evaluate the curing activity of heat-activatable catalyst Examples 1 and 2. The formulation contains DER™ 331 epoxy resin, dicyandiamide and various amounts of heat-activatable catalyst Example 1. DER™ 331 is a liquid diglycidyl ether of bisphenol A, available from The Dow Chemical Company. It has an epoxy equivalent weight of approximately 187. Three samples, designated Examples 3-A through 3-E, are prepared. The ratios of these ingredients are as given in Table 1.

Curing characteristics are evaluated by dynamic scanning calorimetry on a Q2000 instrument from TA Instruments. 5-15 mg of sample are tested under dry nitrogen. The samples are heated from 20° C. to 250° C. at 10° C./minute, held at 250° C. for 30 minutes, then cooled to room temperature at 10° C./minute and then reheated to 250° C. at 10° C./minute. The cure on-set temperature, peak exotherm temperature, $T_g$ of the cured resin and enthalpy are all determined. Results are as indicated in Table 1.

TABLE 1

| | Parts by Weight | | | | |
|---|---|---|---|---|---|
| | Ex. 3-A | Ex. 3-B | Ex. 3-C | Ex. 3-D | Ex. 3-E |
| Ingredients | | | | | |
| Epoxy resin | 93.49 | 92.31 | 89.94 | 93.7 | 91.8 |
| Dicyandiamide | 5.26 | 5.19 | 5.06 | 5.3 | 5.2 |
| Catalyst Example 1 | 1.25 | 2.50 | 5.00 | 0 | 0 |
| Catalyst Example 2 | 0 | 0 | 0 | 1 | 3 |

TABLE 1-continued

| | Parts by Weight | | | | |
|---|---|---|---|---|---|
| | Ex. 3-A | Ex. 3-B | Ex. 3-C | Ex. 3-D | Ex. 3-E |
| Test Results | | | | | |
| On-set temperature, ° C. | 146 | 136 | 126 | 146 | 132 |
| Peak temperature, ° C. | 169 | 160 | 148 | 164 | 151 |
| $T_g$, ° C. | 123 | 123 | 123 | 134 | 125 |
| Enthalpy, J/g | 255 | 282 | 338 | 289 | 310 |

EXAMPLE 4 AND COMPARATIVE SAMPLE A

A toughened crash-durable epoxy adhesive is prepared by mixing 54.65 parts of a mixture of liquid diglycidyl ethers of bisphenol-A, 13.22 parts of an adduct of a butadiene-acrylonitrile rubber and an epoxy resin, available commercially from Schill and Seilacher as Struktol™ 3914, 14 parts of a polyurethane toughener having capped terminal isocyanate groups, 1.49 parts of a wetting agent, 0.72 parts of an epoxy silane, 4.33 parts of dicyandiamide, 5.16 parts of fumed silica, 1 part of a heat-activatable catalyst and 5.43 parts of fillers.

For Example 4, the heat-activatable catalyst is the Example 1 catalyst. For Comparative Sample A, the heat-activatable catalyst is 2,4,6-tris(dimethylaminomethyl)phenol in a poly(vinylphenol) matrix). Active catalyst levels are the same in Example 4 and Comparative Sample A.

The storage stabilities of Example 4 and Comparative Sample A are evaluated at various temperatures as indicated in Table 2 below, by making viscosity measurements at the start of testing and after storing at the specified temperatures for the indicated periods of time. Testing is performed on a Bohlin CS-50 rheometer and a 4°/20 mm plate/cone system. The samples are conditioned at 45° C. for five minutes. While holding the sample at this temperature, the shear rate is increased from 0.1/second to 20/second over five minutes, and then decreased back to 0.1/second at the same rate. Viscosity at 10/second is measured. Results are as indicated in Table 2.

TABLE 2

| Storage Conditions (Temperature, time) | Initial Viscosity, Pa · s (10/sec) | Final Viscosity, cP | Ratio, Final/Initial Viscosity | % Increase** |
|---|---|---|---|---|
| 23° C., 24 weeks | | | | |
| Ex. 4 | 130 | 152 | 1.17 | 17% |
| Comp. Sample A* | 126 | 174 | 1.38 | 38% |
| 30° C., 24 weeks | | | | |
| Ex. 4 | 130 | 176 | 1.35 | 35% |
| Comp. Sample A | 126 | 235 | 1.86 | 86% |
| 40° C., 24 weeks | | | | |
| Ex. 4 | 130 | 402 | 3.1 | 210% |
| Comp. Sample A | 126 | 561 | 4.4 | 340% |

*Not an example of the invention.
**Calculated as 100% × [(final viscosity − initial viscosity)/initial viscosity].

In all cases, significantly better storage stability is seen with the catalyst of the invention.

EXAMPLES 5-6

A 10,000 molecular weight phenol-formaldehyde novolac resin having a softening temperature of 130° C. (Resicure 3057, from SI Group) is ground until it passes through a 100 US mesh screen. 2,4,6-tris(dimethylaminomethyl)phenol (Ancamine K54, from Air Products and Chemicals) is added to an equal weight of the ground novolac resin, and the resulting mixture is stirred at room temperature for 30 minutes.

A 5-15 mg portion of this mixture is then evaluated by DSC on a Model Q2000 modulated analyzer from TA Instruments. The sample is heated from 20° C. to 200° C. at a rate of 10° C./minute. An exotherm is seen commencing at a sample temperature of about 64-67° C. and reaching a peak at about 83-84° C. This exotherm is interpreted as hydrogen bound formation or other complexation between the phenol groups of the novolac resin and the amine groups of the catalyst.

Another portion of the mixture is heated from 23 to 130° C. while measuring its viscosity. The viscosity of the mixture is below 5000 cP until the temperature reaches about 70° C. As the temperature increases from 70° C. to about 90° C., the viscosity of the mixture increases rapidly to over 250,000 cP. The viscosity then decreases to about 14,500 cp at 110° C. and to about 4,000 cp at 130° C.

A third portion of the mixture is heated to 130° C., cooled to room temperature and ground to a powder that passes through a 100 US Mesh screen. The resulting heat-activatable catalyst is designated Example 5, and is formulated into Epoxy Adhesive Example 5 as described below.

Example 6 is prepared and tested in the same manner, except that the ratio of 2,4,6-tris(dimethylaminomethyl)phenol to novolac resin is 44:56 by weight. When evaluated by DSC in the manner described with respect to Example 5, an exotherm is seen commencing at a sample temperature of about 63-68° C. and reaching a peak at about 82-84° C. When the viscosity is measured as described with respect to Example 5, it is seen to increase rapidly from less than 10,000 cP at 65° C. to almost 600,000 cP at about 85° C., after which the viscosity decreases to about 52,000 cP at 110° C. and to about 18,000 cP at 130° C.

A third portion of the mixture is heated to 130° C., cooled to room temperature and ground to a powder. The resulting heat-activatable catalyst is designated Example 6, and is formulated into Epoxy Adhesive Example 6 as described below.

Epoxy Adhesive Examples 5 and 6, which contain heat-activatable catalysts 5 and 6, respectively, are prepared by mixing the ingredients indicated in Table 3:

TABLE 3

| | Parts by Weight | |
|---|---|---|
| Ingredient | Adhesive Ex. 5 | Adhesive Ex. 6 |
| Epoxy Resin A[1] | 49 | 49 |
| Carboxyl-terminated butadiene-acrylonitrile rubber | 4 | 4 |
| Capped polyurethane toughener[2] | 25 | 25 |
| Epoxy Resin B[3] | 2 | 2 |
| Epoxy Silane[4] | 0.2 | 0.2 |
| Dicyandiamide[5] | 5 | 5 |
| Fumed silica | 4 | 4 |
| Fillers | 10.8 | 10.8 |

TABLE 3-continued

| | Parts by Weight | |
|---|---|---|
| Ingredient | Adhesive Ex. 5 | Adhesive Ex. 6 |
| Catalyst Example 1 | 0.9 | 0 |
| Catalyst Example 2 | 0 | 0.9 |

[1]Epoxy Resin A is a liquid diglycidyl ether of bisphenol A having an epoxy equivalent weight of approximately 192. It is available from The Dow Chemical Company as DER ™ 331.
[2]An isocyanate-terminated polyurethane prepolymer prepared from a polyether polyol and an aliphatic diisocyanate, in which the isocyanate groups are capped with o,o-diallyl bisphenol A, and is made as described in Example 13 of EP 308 664. Toughener A has an $M_n$ of 6,900 and an $M_w$ of 13,200.
[3]Epoxy resin B is a diglycidyl ether of a poly(propylene glycol), which has an epoxy equivalent weight of about 320. It is available from The Dow Chemical Company as DER ™ 732. Toughener B is made according to processes described in US 2005/0070634 A1.
[4]Dynasilan A187, available from Evonik Industries AG.
[5]NC700, from Cardolite.
[5]Amicure CG-1200, from Air Products and Chemicals.

Impact peel testing is performed on each of Adhesive Examples 5 and 6 at 23° C. in accordance with ISO 11343 wedge impact method. The adhesives are cured for 20 minutes at 165° C. on cold rolled steel substrates. Testing is performed at an operating speed of 2 m/sec. Results are as indicated in Table 4 below.

The storage stabilities of Adhesive Examples 5 and 6 are evaluated storing the adhesive at 40° C. in a sealed container for one week. Viscosity measurements are made at the start of testing and after storing. Testing is performed at 38° C. on an ARES-G2 shear rheometer and a 25 mm parallel plate system. The samples are conditioned at 38° C. for one minute. While holding the sample at this temperature, the shear rate is brought to a shear rate of 30/second for four minutes. Viscosity at a shear rate of 30/second is measured. Results are indicated in Table 4.

TABLE 4

| Example No. | Initial Viscosity, cP | Final Viscosity, cP | % Viscosity Increase | Impact Peel Strength, N/mm |
|---|---|---|---|---|
| 5 | 115 | 139 | 20 | 30 |
| 6 | 113 | 128 | 14 | 31 |

The data in Table 4 demonstrates that a one-part epoxy adhesive in accordance with the invention exhibits good storage stability, and cures well to form a strong adhesive bond.

EXAMPLES 7-8 AND COMPARATIVE SAMPLE B 56 parts by weight of a 10,000 molecular weight phenol-formaldehyde novolac resin having a softening temperature of 130° C. (Resicure 3057, from SI Group) is mixed with 350 parts of methanol and dissolved by heating to 45° C. The resulting solution is stirred and 44 parts by weight of room temperature 2,4,6-tris(dimethylaminomethyl)phenol (DMP-30, from The Dow Chemical Company) is slowly added. A mixture of the novolac resin and 2,4,6-tris(dimethylaminomethyl)phenol) precipitates from the solution as the catalyst is added, forming a solid phase and a liquid phase that contains mainly methanol. The methanolic liquid phase is poured off. The solid phase is then pulverized and dried at 50° C. for two hours. The resulting material is designated as Catalyst Example 7.

A one-part epoxy adhesive (Adhesive Example 7) identical to Adhesive Examples 5 and 6 is prepared, except that the Catalyst Example 7 is substituted for the catalysts present in Adhesive Examples 5 and 6.

The impact peel strength of Adhesive Example 7 is measured in the manner indicated with respect to Adhesive Examples 5 and 6. The average impact peel strength over three samples is about 31 N/mm, and cohesive failure is seen in all cases.

Adhesive Example 8 is made in the same manner as Adhesive Example 7, except that the catalyst is a 44/56 by weight mixture of the Resicure 3057 novolac resin and 2,4,6-tris(dimethylaminomethyl)phenol, made by melting the resin, adding the aminophenol catalyst to the molten novolac resin, stirring the resulting mixture at 140° C. for 30 minutes and the cooling the resulting mixture to room temperature and grinding it to a powder.

Comparative Example B is also made in the same manner as Adhesive Example 7, except that the catalyst is a commercially available 2,4,6-tris(dimethylaminomethyl)phenol/poly(vinyl phenol) mixture (EP 796 from Huntsman Chemicals).

Storage stability of Adhesive Examples 7 and 8 and Comparative Sample B are determined as described with respect to Adhesive Examples 5 and 6. Results are indicated in Table 5.

TABLE 5

| Sample | Initial Viscosity, cP | Viscosity after 1 week at 40° C. storage, cP | % increase |
|---|---|---|---|
| Adhesive Example 7 | 113 | 119 | 5 |
| Adhesive Example 8 | 115 | 166 | 44 |
| Comparative Sample B | 109 | 290 | 151 |

As can be seen from the data in Table 5, the adhesives containing the heat-activated catalyst of the invention are substantially more storage stable at 40° C. than one (Comparative Sample B) that instead contains the commercially available catalyst in which the tertiary amine is in a poly(vinyl phenol) matrix. Surprisingly, Adhesive Example 7 is also significantly more storage stable than Adhesive Example 8, which indicates that the manner in which the heat-activated catalyst is prepared can be important to its storage stability.

What is claimed is:

1. A one-component epoxy adhesive, comprising
   A) one or more epoxy resins;
   B) at least one epoxy hardener having a melting temperature of at least 50° C.; and
   C) a particulate heat-activatable catalyst composition having a volume average particle size of 100 nanometers to 10 microns comprising a mixture of a liquid aminophenol compound selected from the group consisting of 2,6-bis(dimethylaminomethyl)phenol and 2,4-bis(dimethylaminomethyl)phenol, or a solid aminophenol compound that has a boiling temperature of at least 130° C. and a melting temperature of no greater than 60° C.; and a phenol novolac resin that has a weight average molecular weight of 10,000 to 25,000 and a softening temperature of 130 to 200° C.;
   wherein the weight ratio of the aminophenol compound and the phenol novolac resin is from 40:60 to 70:30.

2. The one-component epoxy adhesive of claim 1 wherein the heat-activatable catalyst composition is made in a process that includes the steps of:
   a) mixing the aminophenol compound with a liquid solution of the phenol novolac resin in ethanol or methanol, at a temperature above the melting temperature of the aminophenol compound but not greater than 80° C. and not greater than the boiling temperature of the ethanol or methanol and at proportions such that from 0.1 to 10 equivalents of phenol groups are provided by the phenol novolac resin per equivalent of tertiary amine groups provided by the aminophenol compound, whereby the reaction mixture separates into a liquid phase containing mainly the ethanol or methanol and a precipitate of the aminophenol compound and the phenol novolac resin;
   b) separating the precipitate from the liquid phase while maintaining the temperature of the precipitate at no greater than 80° C. and
   c) drying the separated precipitate at a temperature of no greater than 80° C. to remove residual ethanol or methanol from the precipitate.

* * * * *